United States Patent
Edwards et al.

(10) Patent No.: US 11,421,731 B2
(45) Date of Patent: Aug. 23, 2022

(54) FREEWHEEL AND THRUST BEARINGS SYSTEM AND VEHICLE TRANSMISSION SYSTEMS INCLUDING SUCH A SYSTEM

(71) Applicant: FREEFLOW TECHNOLOGIES LIMITED, Glasgow (GB)

(72) Inventors: Neil Edwards, Glasgow (GB); Neil MacMartin, Glasgow (GB)

(73) Assignee: FreeFlow Technologies Limited, Glasgow (GB)

( * ) Notice: Subject to any disclaimer, the term of this patent is extended or adjusted under 35 U.S.C. 154(b) by 0 days.

(21) Appl. No.: 16/968,085

(22) PCT Filed: Feb. 6, 2019

(86) PCT No.: PCT/GB2019/050324
§ 371 (c)(1),
(2) Date: Aug. 6, 2020

(87) PCT Pub. No.: WO2019/155208
PCT Pub. Date: Aug. 15, 2019

(65) Prior Publication Data
US 2021/0025444 A1  Jan. 28, 2021

(51) Int. Cl.
| | |
|---|---|
| *F16D 41/28* | (2006.01) |
| *F16C 19/30* | (2006.01) |
| *F16C 33/58* | (2006.01) |
| *F16D 41/069* | (2006.01) |

(52) U.S. Cl.
CPC ............ *F16C 19/30* (2013.01); *F16C 33/581* (2013.01); *F16D 41/069* (2013.01); *F16D 41/28* (2013.01); *F16C 2326/28* (2013.01)

(58) Field of Classification Search
CPC ...... F16C 19/30; F16C 33/581; F16D 41/069; F16D 41/28
See application file for complete search history.

(56) References Cited

FOREIGN PATENT DOCUMENTS

| | | | | |
|---|---|---|---|---|
| CN | 200975416 Y | 11/2007 | | |
| CN | 205823916 U | 12/2016 | | |
| DE | 2046829 | 3/1972 | | |
| DE | 2046829 A1 | * 3/1972 | ............ | F16C 19/22 |
| FR | 2163194 | * 12/1972 | ............ | F16D 41/00 |

* cited by examiner

*Primary Examiner* — Huan Le

(57) ABSTRACT

A one-way bearing, a bearing assembly, and a free-wheeling mechanism for a bicycle are disclosed herewith. The bearing assembly, in one aspect, includes a one-directional bearing having an inner and an outer race, the one-directional bearing including a sprag clutch mechanism. The bearing assembly, according to this aspect, further includes a first thrust bearing and a second thrust bearing, wherein the inner and outer races of the one-directional bearing are formed to retain one or both of the first or second thrust bearings, and a one-directional bearing mechanism located between the inner and outer races. In at least one aspect, the inner race has a flange extending in a radially outward direction, the sprag clutch mechanism abuts the flange on an inner axial side of the flange, and the flange abuts the first thrust bearing on an outer axial side of the flange.

14 Claims, 5 Drawing Sheets

FREEWHEEL AND THRUST BEARINGS SYSTEM AND VEHICLE TRANSMISSION SYSTEMS INCLUDING SUCH A SYSTEM

FIELD OF THE INVENTION

The present invention relates to gearing transmission systems, especially those used in bicycles, but may be used in other vehicle and non-vehicle applications. In addition, a novel bearing assembly is described.

BACKGROUND TO THE INVENTION

Bicycles are usually provided with a freewheel mechanism. This is provided in the rear wheel hub and allows the rider to cease pedalling without the rear wheel locking up as it would in a fixed gear bicycle.

In this standard prior art set-up, once the rider ceases pedalling, the chain, front crank and rear sprocket/rear cassette all cease rotation, as the rear hub continues to rotate.

As torque is reapplied by the rider, there can be a perceptible and unnerving take up of torque by the crank/chain/sprocket assembly.

Front free wheel mechanisms have been proposed, but suffer from numerous drawbacks; they may simply be a rear freewheel mechanism relocated to the front crank, or may not be suitable for the various forces being exerted on the front chain-set components, or may undesirably increase the effective width between the opposing pedal crank arms.

SUMMARY OF THE INVENTION

According to a first aspect of the present invention there is provided a bearing assembly, comprising a one-directional bearing having an inner and outer race, a first thrust bearing and a second thrust bearing, wherein the inner and outer races of the one-directional bearing are formed to retain one or both of the thrust bearings.

The bearing assembly will have an axis of rotation and mention of "axial" and "axially" means distances measured along this axis, and mention of "radial" and "radially" means distances away from this axis.

The outer race may comprise a generally ring shaped portion and one or more flange portions.

The one or more flange portions may extend axially inwardly from the outer race.

The first or second thrust bearing may be located axially inboard of the flange portion(s) of the outer race.

The first or second thrust bearings may be located axially outboard of the inner race.

The first or second thrust bearing may therefore be sandwiched in an axial direction between the inner and outer races of the one-directional bearing.

The other of the first or second thrust bearings may be located on the distal side of the inner and/or outer race from the first or second thrust bearing.

The other of the first or second thrust bearing may have an outer race which is rotationally coupled to the outer race of the one-directional bearing.

The one-directional bearing may have a sprag clutch mechanism, comprising a ring and pawl arrangement.

The ring and pawl arrangement may be provided in a resilient flexible material.

The other of the first or second thrust bearing may abut the ring of the sprag clutch mechanism.

The inner race of the one-directional bearing may have a flange extending radially outward.

The flange so extending may abut the first or second thrust bearing.

The thrust bearings may be needle bearings.

According to a second aspect of the present invention there is provided a one-way bearing comprising an outer race and an inner race with a one-directional bearing mechanism located between said inner and outer races, the inner race comprising an inner race ring portion, with an inner flange projecting from the inner race ring portion in a first direction parallel to an axis of rotation of the bearing, and an outer flange, projecting in a second direction away from the axis of rotation of the bearing, an outer race comprising an outer race ring portion and an outer flange portion extending axially inwardly from the outer race ring portion, there therefore being defined a first bearing surface around an outer circumference of the inner race ring portion, a second bearing surface defined by the inner circumference of the outer race ring portion, a third bearing surface defined by a first sidewall of the inner race ring portion and/or the inner flange, a fourth bearing surface defined by a second sidewall of the inner race ring portion and/or the outer flange and a fifth bearing surface defined by an inner surface of the outer race flange portion.

A first thrust bearing may be provided between the third and fifth bearing surfaces.

A second thrust bearing may be provided on the fourth bearing surface.

According to a third aspect of the present invention there is provided free-wheeling mechanism for a bicycle including at least one bearing assembly or bearing according to the first and/or second aspects of the present invention.

According to a fourth aspect of the present invention there is provided a vehicle transmission system including at least one bearing assembly or bearing according to the first and/or second aspects of the present invention.

BRIEF DESCRIPTION OF THE DRAWINGS

Embodiments of the invention will now be described, by way of example only, with reference to the following drawings, in which.

Figure 1:
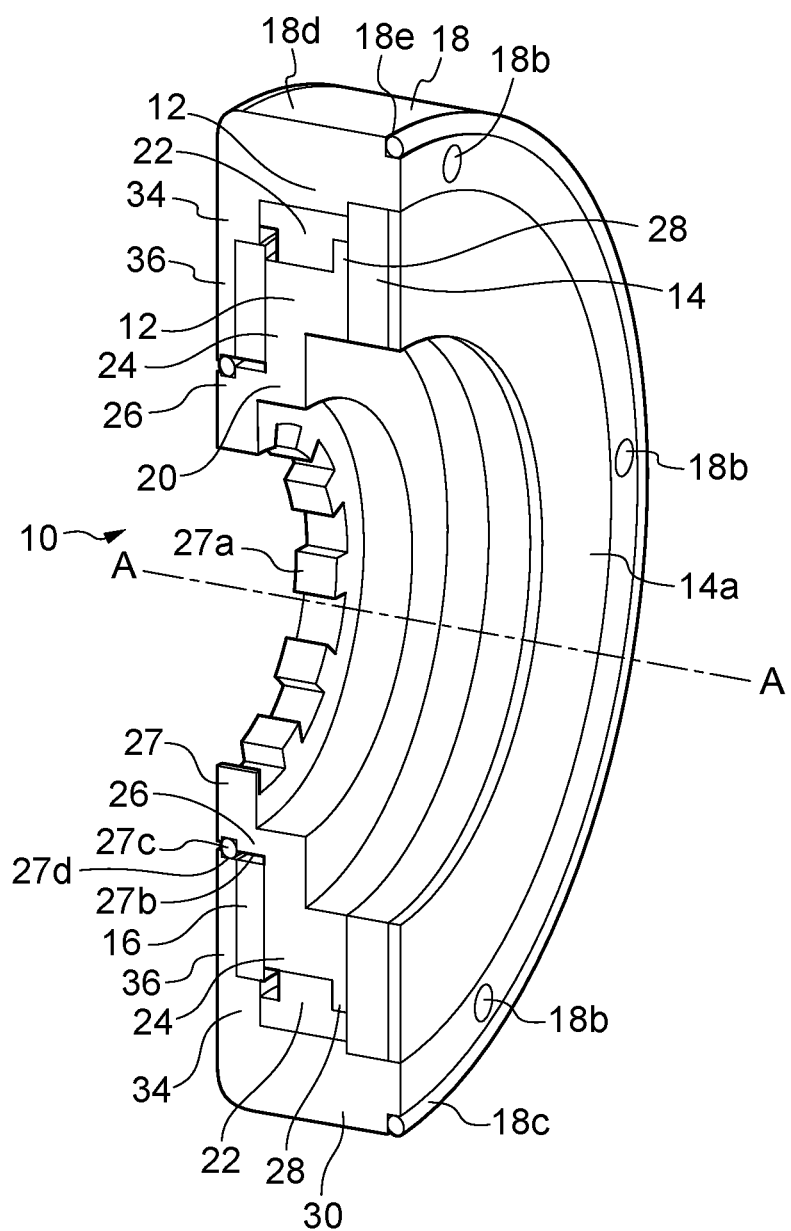
FIG. 1 is a sectional perspective view of a bearing and bearing assembly according to a first aspect of the present invention and a bearing assembly according to a second aspect of the present invention.
Figure 2:
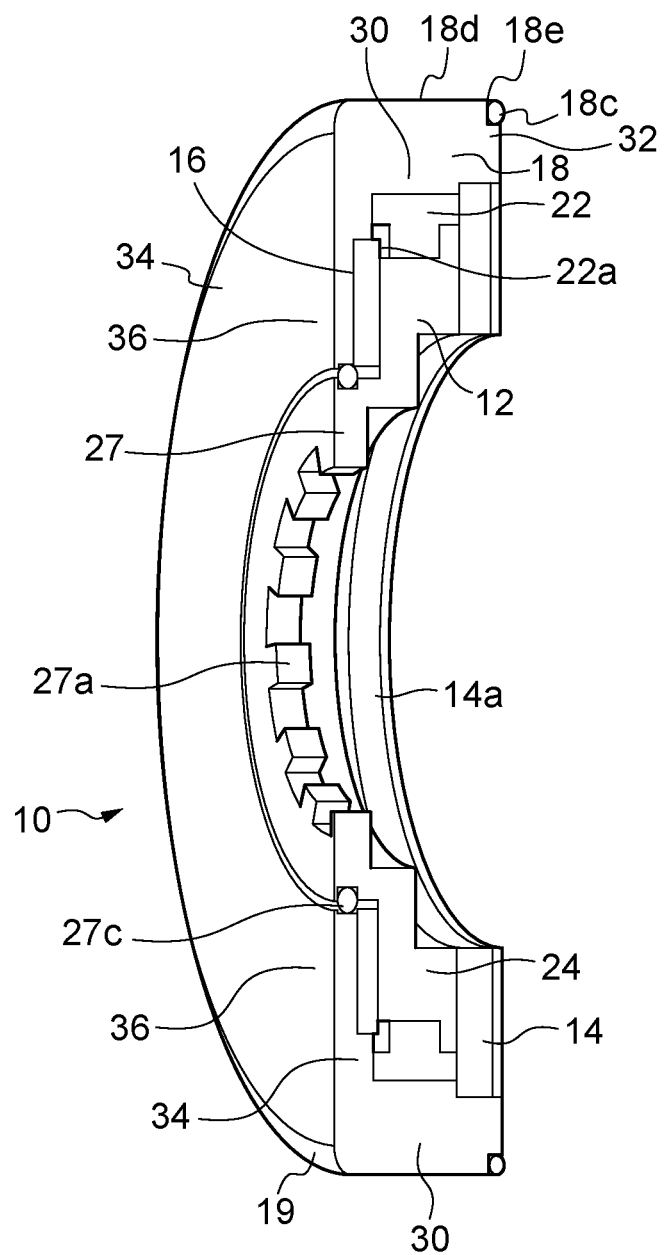
FIG. 2 is a perspective view of a bearing and bearing assembly of FIG. 1.
Figure 3:
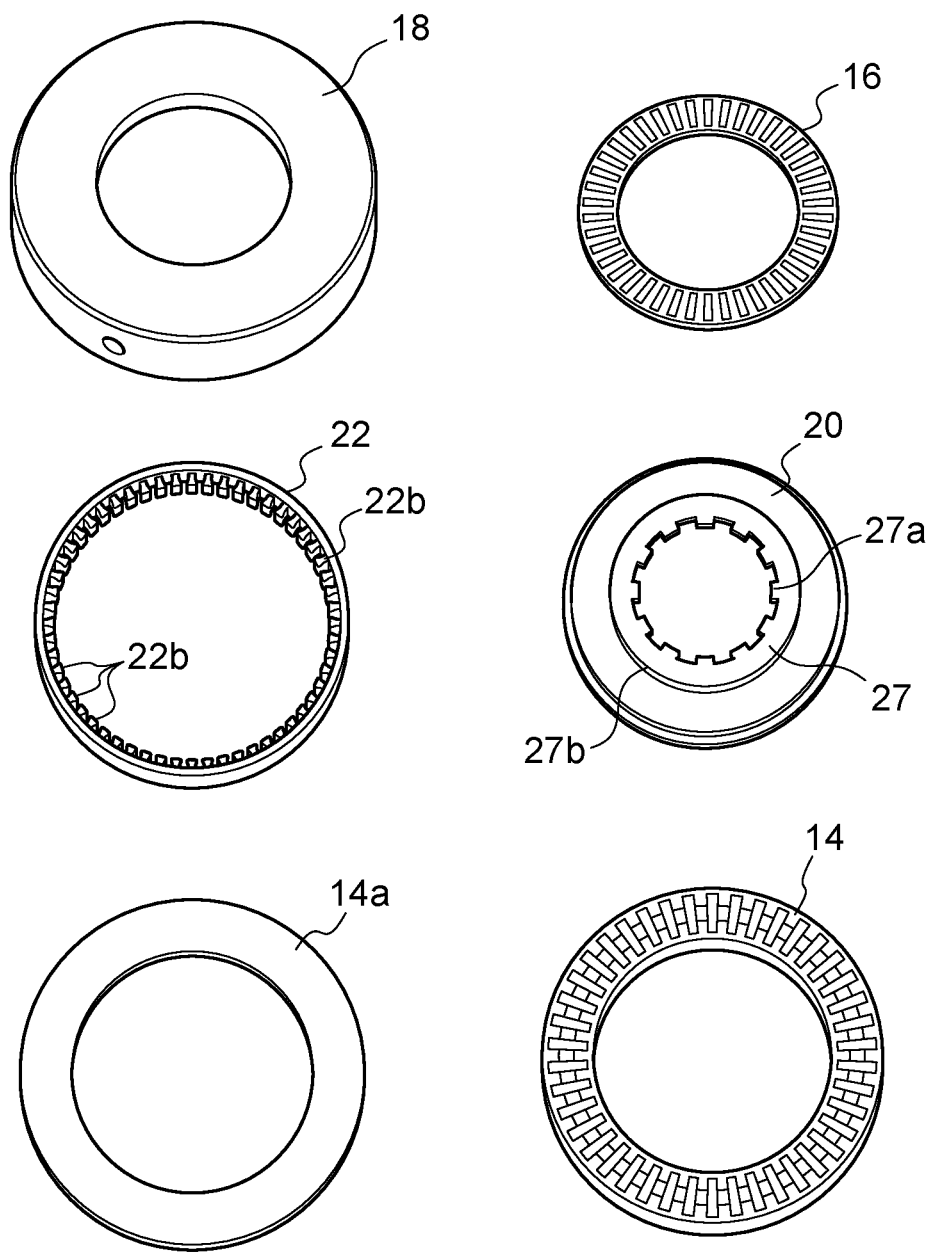
FIG. 3 is a plan view of the various components of the bearing assembly of FIGS. 1 and 2.

Referring to the drawings and initially to FIG. 1, a bearing assembly 10 is depicted. The bearing assembly 10 comprises a one-directional bearing 12, with a first thrust bearing 14 located on a first or "inner" side of the bearing assembly 10 and a second thrust bearing 16 located on a second or "outer" side of the bearing assembly 12. The bearing assembly 10 has an axis of rotation A-A.

When considered in isolation, it will be understood that "inner" and "outer" are arbitrary terms and provide a convenient way of describing either side of the bearing assembly 10, albeit when the bearing assembly 10 is used in a bicycle transmission system, as described below, the reason for the use of these relative terms will be apparent.

The one-directional bearing 12 comprises an outer race 18 and an inner race 20 with a one-directional bearing mechanism 22 located between said inner 20 and outer races 18, the inner race 20 comprising an inner race ring portion 24, with an inner flange 26 projecting from the inner race ring portion 24 in a first direction parallel to the axis of rotation A-A of the bearing assembly 10, and an outer flange 28, projecting in a second direction away from the axis of rotation A-A of the bearing assembly 10.

A splined collar portion 27 is located on the outer side of the inner flange 26, the splined collar portion 27 having an internal splined surface 27a and an outer smooth surface 27b. A smaller rubber O-ring seal 27c is provided on the outside edge of the outer smooth surface 27b, being the "outer" side of the bearing assembly 10. A O-ring seating groove 27d is provided to enable placement of the O-ring seal 27c.

The one-directional bearing mechanism 22 in the present embodiment is a sprag clutch mechanism, but this may be varied.

The use of a sprag clutch mechanism 22 offers the advantage of a smoother drive engagement when the bearing rotates in the drive direction of rotation.

The sprag clutch mechanism comprises a resilient ring 22a, with a plurality of pawls 22b projecting inwardly from the ring 22a.

The one-directional bearing mechanism 22 abuts the outer flange 28 on the "inner" side.

The outer race 18 comprises an outer race ring portion 30. An inner flange 32 projects outwardly parallel to the axis of rotation A-A of the bearing assembly 10 from the outer race ring portion 30 on the "inner" side of the bearing assembly 10, proximal to the side of the bearing assembly 10 on which the outer flange 28 of the inner race 20 is located.

A first outer race outer flange 34 is provided on the distal or outer side of the outer race 18 from the inner flange 32, being in the present embodiment approximately equal in shape and thickness to that of the inner flange 32.

A second outer race outer flange 36 projects from first outer race outer flange 34 inwardly towards the axis A-A, the second outer race outer flange 36 being more elongate and thinner than the first outer race outer flange 34.

Although described as separate portions for clarity, it will be understood that the various components of the outer and inner races are formed as integral units. The two outer flange portions may also be viewed as a single stepped flange portion.

An outer race fillet 19 is provided around the outer edge of the outer race 18 providing a smooth transition to the outer, external surfaces of the flanges 34, 36.

The second outer race outer flange 36 terminates proximal to the O-ring seal 27c.

A plurality of threaded bores 18b are provided around the "inner" surface 18a of the outer race 18, that being the surface located distally from the second outer race outer flange 36 and the first outer race outer flange 34.

A larger O-ring seal 18c is provided at the junction between the inner surface 18a of the outer race 18 and an exterior surface 18d of the outer race 18. An O-ring groove 18e is formed at the junction to enable placement.

The second thrust bearing 16 is a needle thrust bearing of a known type, being a generally disk-shaped bearing with a plurality of needle rollers provided around the disk, each having axes of rotation perpendicular to the main bearing axis A-A arranged radially around and within the disk.

The second thrust bearing 16 is located between the inner surface 36a of the second outer race outer flange 36 and the outer axial surface 20a of the inner race 20. These two surfaces 20a, 36a form bearing surfaces for the second thrust bearing 16 and "sandwich" the second thrust bearing 16 between them. The second thrust bearing 16 abuts the first outer race outer flange 34 which provides a radial abutment. The second thrust bearing is therefore located axially "outboard" of the inner race 20 i.e. away from the centre plane of the bearing assembly and axially "inboard" of the flange of the outer race.

The first thrust bearing 14 is located on the "inner" side of the bearing assembly 10 and abuts the inner race ring portion 24 and the inner flange 26. An inner bearing race 14a is positioned at the innermost portion of the bearing assembly 10, within the confines of, and generally coplanar with the "inner" surface 18a of the outer race 18. It may form an interference fit with the outer race, or may employ alternative attachment methods, such as are known in the art or as described below.

Figure 4:
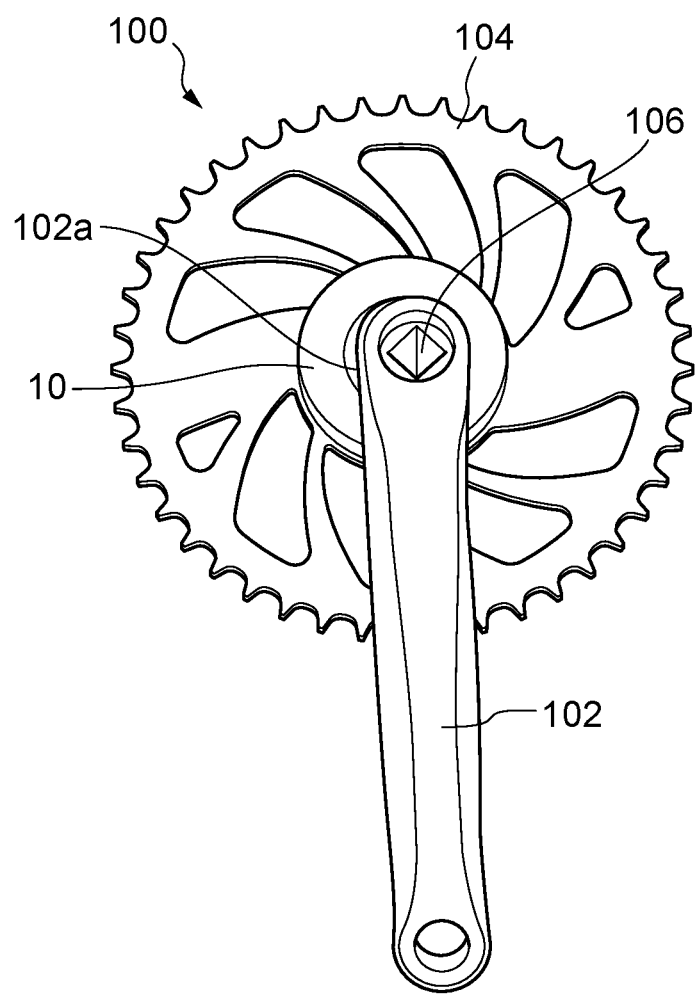
FIG. 4 is a side elevation of a chain-ring and crank assembly according to a third aspect of the present invention.

The bearing assembly 10 may be used as a part of a front free-wheeling mechanism 100 for a bicycle B. FIG. 4 depicts such a mechanism 100.

The bearing assembly 10 of the present invention has an axial thickness of 13.5 mm, so provides a compact unit for fitting.

The freewheeling mechanism 100 comprises a bearing assembly 10, a crank arm 102 and a chain-ring 104. Chain C is mounted around the chain-ring 104 at a first end and around a rear hub H at a second end. The rear hub H is a fixed hub, since the freewheeling function is taken up by freewheeling mechanism 100.

The crank arm 102 has an attachment portion 102a which has a complementary form to the internal splined surface 27a. Although numerous attachment methods are possible, in the present embodiment the attachment portion 102a extends into the interior of the bearing assembly 10, slightly past the width of the internal splined surface 27a, and is deformed by pressing, thereby securely clamping the crank arm 102 to the bearing assembly 10.

Chain-ring 104 attaches to the outer race 18 via mechanical connections to the threaded bores 18b. The larger O-ring seal 18c is compressed by the chain-ring 104 to form a seal on the inner side of the bearing assembly 10.

The crank arm 102 has an axle aperture 106 which allows the assembly to be mounted on bicycle B, with an axle 108 attaching to a second crank arm 110 on the distal side of the bottom bracket shell 112.

Figure 5:
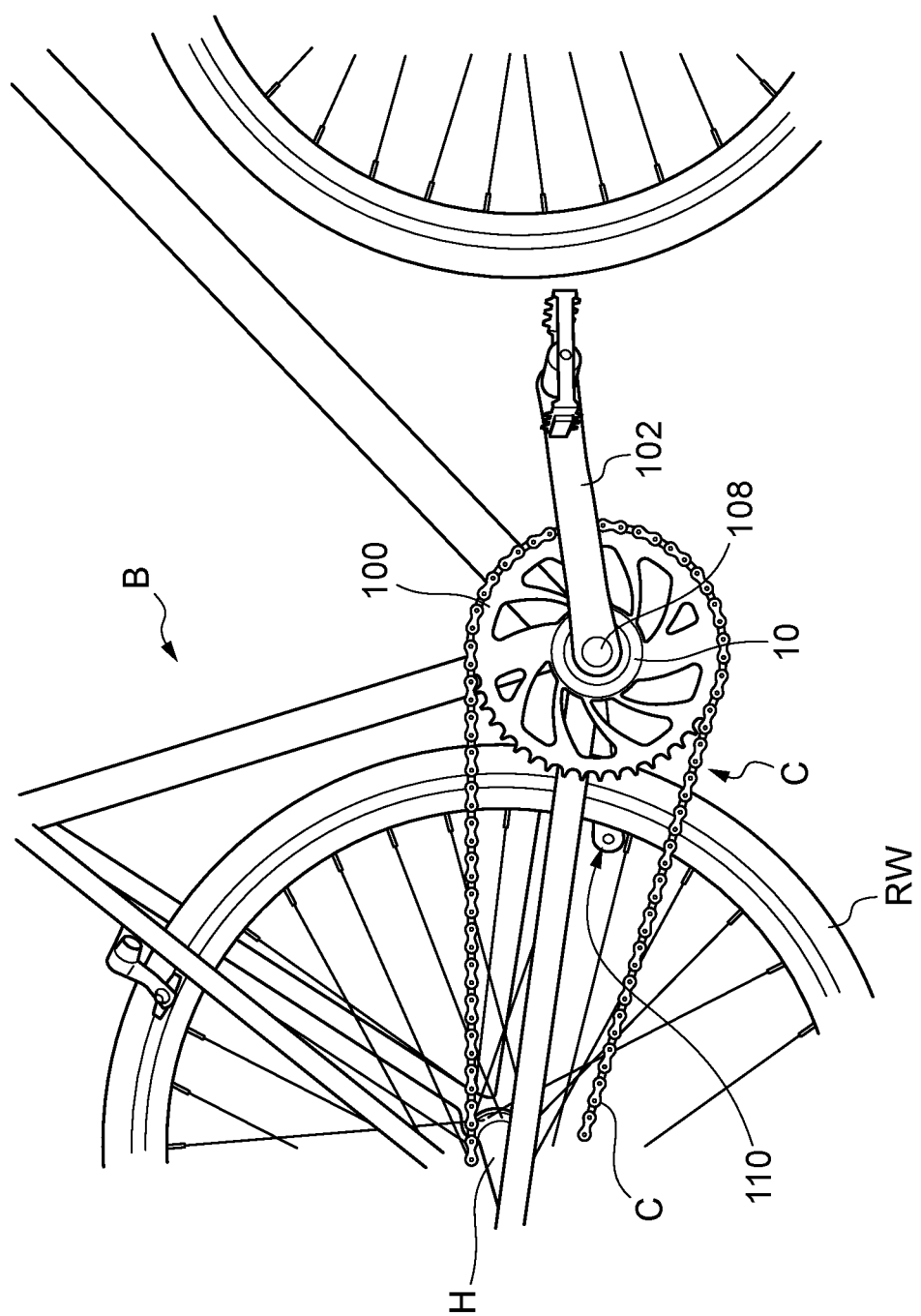
FIG. 5 is a bicycle according to the fourth aspect of the present invention.

Pedalling the crank arms 102, 110 forward (clockwise from the perspective of FIG. 5) causes the pawls 22b to form an interference fit between inner and outer races 18,20 to form, and therefore the rotational motion to be transmitted through the bearing assembly, causing chain-ring 104 to rotate, and chain C to rotate hub H and rear wheel RW.

When such pedalling motion ceases, or is indeed reversed (anti-clockwise from the perspective of FIG. 5) the pawls 22b disengage and the interference fit is terminated. Chain C is then driven by the rotational motion of rear wheel RW and the hub H and continues to drive rotational motion of the chain-ring 104 and the outer race 18.

The present disclosure provides a front chain-ring/sprocket freewheeling mechanism which has a relatively small axial length/thickness, and therefore may be fitted to a bicycle with minimal additional distance between the two crank arms.

Moreover, the thrust bearings provide greater support against axial loading and bending moments, thereby improving rotational function and efficiency.

The invention is not limited to the embodiments hereinbefore described, but may be varied in construction and detail.

The outer surface of the outer race may be provided with a bleed nipple or bleed screw to manage interior lubrication.

In addition to bicycles, the bearing and/or bearing assembly may be used in other vehicle transmission systems.

The one way bearing without the thrust bearings may be described as comprising an outer race and an inner race with a one-directional bearing mechanism located between said inner and outer races, the inner race comprising an inner race ring portion, with an inner flange projecting from the inner race ring portion in a first direction parallel to an axis of rotation of the bearing, and an outer flange, projecting in a second direction away from the axis of rotation of the bearing, an outer race comprising an outer race ring portion and an outer flange portion extending axially inwardly from the outer race ring portion, there therefore being defined a first bearing surface around an outer circumference of the inner race ring portion, a second bearing surface defined by the inner circumference of the outer race ring portion, a third bearing surface defined by a first sidewall of the inner race ring portion and/or the inner flange, a fourth bearing surface defined by a second sidewall of the inner race ring portion and/or the outer flange and a fifth bearing surface defined by an inner surface of the outer race flange portion.

The invention claimed is:

1. A bearing assembly, comprising:
a one-directional bearing having an inner and an outer race, the inner race having a flange extending in a radially outward direction, and the one-directional bearing further including a sprag clutch mechanism located between the inner and outer races; and
a first thrust bearing and a second thrust bearing, wherein the inner and outer races of the one-directional bearing are formed to retain one or both of the first or second thrust bearings, and further wherein the sprag clutch mechanism abuts an inner axial side of the flange, and the first thrust bearing abuts an outer axial side of the flange.

2. The bearing assembly of claim 1 wherein the outer race comprises a generally ring shaped portion and one or more flange portions.

3. The bearing assembly of claim 2 wherein the one or more flange portions extends axially inwardly from the outer race.

4. The bearing assembly of claim 2 wherein the first or second thrust bearing is located axially inboard of the one or more flange portions of the outer race.

5. The bearing assembly of claim 1 wherein the sprag clutch mechanism includes a ring and pawl arrangement.

6. The bearing assembly of claim 5 wherein the ring and pawl arrangement is provided in a resilient flexible material.

7. The bearing assembly of claim 5 or 6 wherein the first thrust bearing abuts the ring of the sprag clutch mechanism.

8. The bearing assembly of claim 1 wherein the first or second thrust bearings are needle bearings.

9. A free-wheeling mechanism for a bicycle including at least one bearing assembly according to claim 1.

10. A vehicle transmission system including at least one bearing assembly according to claim 1.

11. A bicycle including at least one bearing assembly according to claim 1.

12. The bearing assembly of claim 1, wherein the inner race further comprises an inner race ring portion, with an inner flange projecting from the inner race ring portion in a first direction parallel to an axis of rotation of the bearing assembly.

13. The bearing assembly of claim 1 wherein the outer race is configured for mechanical attachment of a chain ring thereto.

14. A bearing assembly, comprising:
a one-directional bearing having an inner and an outer race, the one-directional bearing including a sprag clutch mechanism comprising a ring and pawl arrangement; and
a first thrust bearing and a second thrust bearing, wherein the inner and outer races of the one-directional bearing are formed to retain one or both of the first or second thrust bearings.

* * * * *